United States Patent [19]

Hall et al.

[11] Patent Number: 5,010,636
[45] Date of Patent: Apr. 30, 1991

[54] METHOD FOR PRECONDITIONING BELTS ON BELT DRIVES

[75] Inventors: Erich Hall, Wettstetten; Helmut Schorwerth, Ingolstadt, both of Fed. Rep. of Germany

[73] Assignee: Audi AG, Ingolstadt, Fed. Rep. of Germany

[21] Appl. No.: 370,838

[22] Filed: Jun. 23, 1989

[30] Foreign Application Priority Data

Jun. 24, 1988 [DE] Fed. Rep. of Germany ....... 3821369

[51] Int. Cl.$^5$ ............................................. B23P 11/02
[52] U.S. Cl. ...................................... 29/446; 474/101
[58] Field of Search ................ 29/446, 452, 434, 436; 474/110, 113, 115, 116, 117, 135, 101, 103, 104, 132, 133

[56] References Cited

U.S. PATENT DOCUMENTS

| | | | |
|---|---|---|---|
| 1,166,979 | 1/1916 | Gallet | 474/113 |
| 3,091,837 | 6/1963 | McCormick | 29/452 X |
| 3,406,582 | 10/1968 | Frentzel | 474/110 |
| 3,415,238 | 12/1968 | Wagner | 474/113 X |
| 3,444,750 | 5/1969 | Stuller | 474/110 |
| 3,922,927 | 12/1975 | Shiki et al. | 474/113 |
| 4,571,221 | 2/1986 | Isobe et al. | 474/113 X |
| 4,583,961 | 4/1986 | Kawasawa et al. | 474/113 |
| 4,601,683 | 7/1986 | Foster | 474/110 X |
| 4,622,024 | 11/1986 | Lawson | . |
| 4,674,996 | 6/1987 | Anno et al. | 474/110 |
| 4,728,317 | 3/1988 | Martz et al. | 474/110 |

FOREIGN PATENT DOCUMENTS 3039215 10/1980 Fed. Rep. of Germany .

Primary Examiner—Mark Rosenbaum
Assistant Examiner—Frances Chin
Attorney, Agent, or Firm—Lalos & Keegan

[57] ABSTRACT

The invention relates to a method and apparatus for installing belts on belt drives of the type where the belt is tensioned on the belt drive with the use of an adjustable tensioning device. In order to avoid a rapid slacking of the adjusted belt tension, the belt is driven in a preconditioning device at a defined tension value for a predetermined period or time. The belt is preferably installed on the belt drive immediately after removal from the preconditioning device. The preconditioning device includes a drive motor for driving a first pulley, a second pivoted pulley, and a tensioning device for tensioning the belt while it is carried by the pulleys.

10 Claims, 2 Drawing Sheets

METHOD FOR PRECONDITIONING BELTS ON BELT DRIVES

A method and device for installing belts on belt drives.

BACKGROUND OF THE INVENTION

The present invention relates to a method and a device for installing belts on belt drives, particularly V-belts for driving auxiliary equipment on internal combustion engines. It is known that belt drives that use belts made of elastic material (flat belts, V-belts, serrated belts, etc.) are liable to sag (become elongated) after a period of use following initial installation. As a result, the initially adjusted tension quickly diminishes, and if the belt is not retensioned early on, slipping will occur. It is not possible to compensate for the resulting "sagging" of the belt by increasing initial tension during initial installation, since this produces over-straining in the entire belt drive and belt noise. A prior art solution involves subsequent tensioning of the belt after an initial period of use. However, this is too cumbersome and often involves substantial extra work (i.e. dismantling of beltcover, etc.). For internal combustion engines in automobiles with belt drives that, e.g., drive a generator, early retensioning defeats efforts aimed at ensuring long intervals between maintenance services.

SUMMARY OF THE INVENTION

The method of the present invention renders an early retensioning of the drive unnecessary, and requires little additional effort during the initial installation stage Moreover, a suitable device for implementing the method has been devised. In accordance with the present invention a preconditioning device is proposed, on which the belt is easily installed and driven, during a specified time at a certain pretension level, before being initially installed on the belt drive itself. The term "pretension level" refers to the tension level of the belt prior to any significant use of the belt on the belt drive for which it is intended. The preconditioning device produces an initial slacking of the belt, making it more tension-stable and permits it, after a first installation, to retain its pretension level for a longer time, thus preventing slipping. A particular advantage of the present invention results from the step of installing the belt immediately after its removal from the preconditioning device. The inventors recognized that after being preconditioned on the device, the belts, due to their elastic characteristic, began to regress or form back after a period of time, thereby decreasing their tension-stabilizing condition. This disadvantage is prevented by an immediate "hot-state" installation of the belt on the corresponding belt drive. Substantially increased running times of the belt at the acceptable pretension level are thus obtained. For V-belts normally used in automobiles for driving generators on internal combustion engines, a preconditioning time of approximately 3–5 minutes at normal pretension levels has been found to be sufficient. It is preferred that the pretension level is held constant during the preconditioning time. The number of revolutions of the pulley driving the belt should preferably be between 1000–2000 per min. and the diameter of the pulley should not fall below 60 mm, in order to favorably influence the milling work of the belts. The method of the present invention may be incorporated into a production line, especially in the serial production of internal combustion engines on a production or assembly line. The preconditioning device is thereby integrated in the assembly line and logically connected with a production control unit. Accordingly, the belts are delivered to the preconditioning device in the proper assembly order, driven there and then immediately delivered for initial installation on the engine belt drive. The belts thus follow the standard production line installation sequence except for the intervening preconditioning device. The invention is explained in more detail in the following detailed description and accompanying drawings.

DETAILED DESCRIPTION

Figure 1:
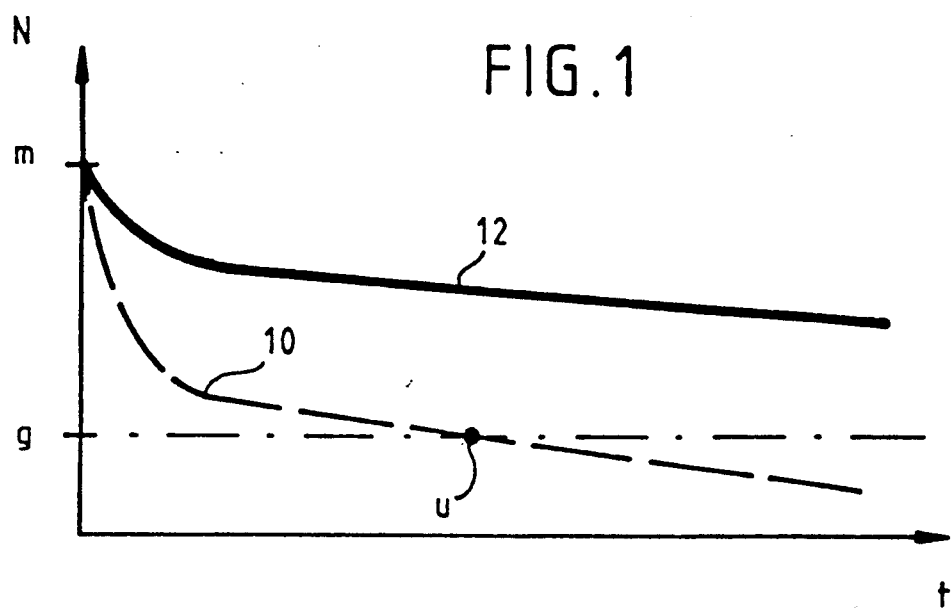
FIG. 1 illustrates a tension curve of a traditionally installed V-belt and a V-belt installed according to the invention for driving a generator on an internal combustion engine in an automobile.

FIG. 1 illustrates the tension behavior of a traditional model V-belt used, for instance, for driving generators on internal combustion engines in automobiles. The tension (taut sideforce) in Newtons N established to a value m during initial installation decreases during the time of operation in the manner shown in the depicted curves (dotted and solid lines). The dot-dash line g indicates a value below which retensioning of the V-belt becomes absolutely necessary. The dashed line 10 is shown for a V-belt that was installed on the belt drives without being preconditioned in accordance with the present invention. As can be seen, its pretension decreases considerably during initial operation (steep downward branch) and, after a relatively short operation time, requires a retensioning at point u. If retensioning is not performed, the belt tension level will decrease to an unacceptable low value and the V-belt will slip off.

The curve 12 depicted in a solid line illustrates the tension level of a tension-stabilized V-belt. Before initial installation, the belt was driven in the preconditioning device (described below) for 3 minutes at a constant pretension level (taut side force) at the value m, at 1500 rpm, and with pulley diameters of 70 mm. After a period of approximately 5 minutes the belt was installed on the engine belt drive. As the curve shows, the immediate decrease from the pretension level after initial installation is substantially less. The tension level is situated significantly above the line g and progresses almost horizontally for a significant portion of the total depicted time of operation t of the V-belt. This is in distinct contrast to the tension level for the V-belt depicted by curve 10. The critical value g necessitating retensioning of the V-belt is reached at a much later point in time (not shown in FIG. 1).

Figure 2:
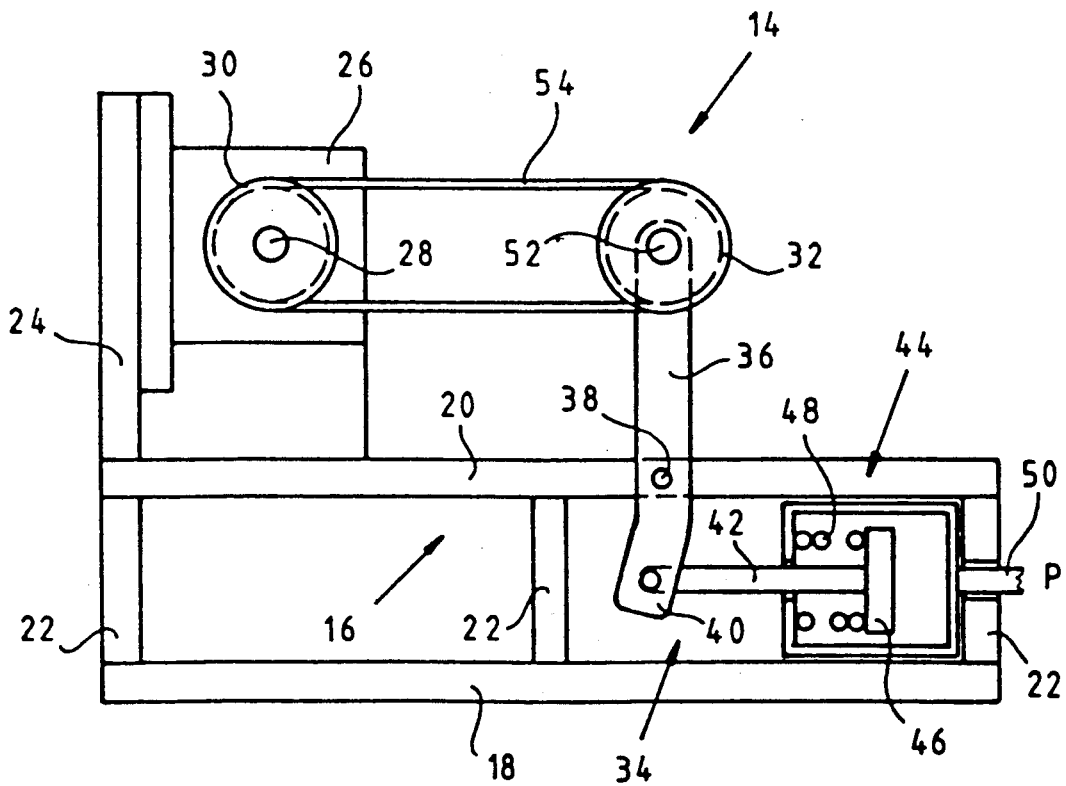
FIG. 2 illustrates a preconditioning device with a drive engine, a second pivoted pulley and a tensioning device.

The preconditioning device 14, shown in FIG. 2, comprises a frame 16 with several struts 18, 20, 22, 24, a drive engine 26 in the form of an electric motor, a first pulley 30 attached to the shaft 28 of the electric motor, a second pulley 32 and a tensioning device 34. The electric motor 26 is attached to the struts 24 of the frame 16. As is conventional, motor 26 is connected to an on-off switch at a source of electrical current (not shown). The pulley 32 is pivoted on a double-armed tensioning lever 36. The tensioning lever 36 can be tilted via a bolt 38 hinged on the strut 20. At its free arm 40, lever 36 is gripped by a rod 42 of a hydraulic operating cylinder 44. The operating cylinder is attached to the frame 16 and includes an actuating piston 46 connected to the rod 42. Inside the operating cylinder 44, a compression spring 48 is provided for resetting the tensioning lever 36 of the fluid-actuated tensioning device 34. It is understood that the pivotal arrangement of the pulleys 30, 32, is paraxial and situated in a common circumferential plane.

The hydraulic operating cylinder 44 is connected via a pipe 50 and conventional hydraulic pilot valve to a pressure medium source (not shown). In an unactuated state, both revolving axes 28, 52 of the pulleys 30, 32 ae located near one another so that the V-belt 54 that is to be driven can be placed easily on the pulleys 30, 32. By turning on the electric motor 26 and simultaneously actuating the hydraulic pilot valve, the hydraulic operating cylinder 44 tilts the tensioning lever 36 clockwise until reaching the desired pretension level (e.g., taut side force 500 N) in the V-belt 54. This tension level is maintained by controlling the corresponding pressure P on the operating cylinder 44. Following a desired preconditioning time of 3 minutes, the drive engine 26 is turned off, e.g., automatically, and, via the hydraulic pilot valve 50, the hydraulic operating cylinder 44 is relieved of pressure. The compression spring 48 thereby returns the operating cylinder 44 to its retracted position. The V-belt 54 can be taken off the preconditioning device 14 once the tensioning lever 36 has been tilted counterclockwise.

Figure 3:
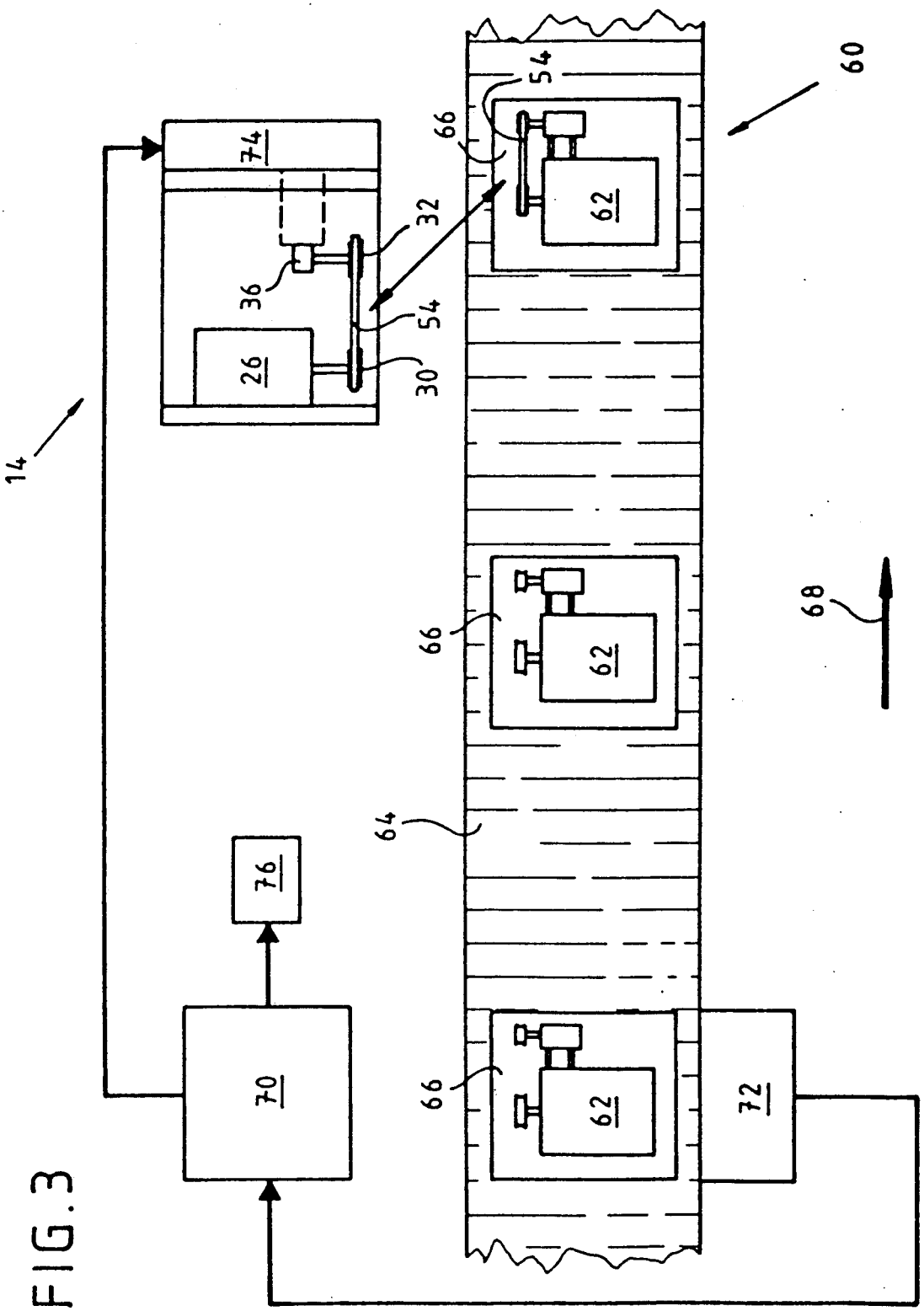
FIG. 3 illustrates a preconditioning device according to FIG. 2 integrated in an assembly line for the production or final assembly of internal combustion engines for automobiles.

FIG. 3 depicts in stages an assembly line 60 for the final assembly of internal combustion engines for automobiles. The assembly line consists of a conveyer plant 64 where the internal combustion engine 62 is mounted on individual assembly stands 66 and transported in the direction of the arrow 68. During their travel, the internal combustion engines and the auxiliary equipment are assembled or completed at the individual assembly points. The assembly line 60 is connected to an electronic production control unit 70, where data identifying the type of internal combustion engine that is to be assembled is read in via a coding device 72. Integrated in the assembly line 60 is the preconditioning device 14, set up in close proximity to the assembly point where the V-belt 54 for the internal combustion engine, not depicted in detail, is installed on the belt drive. The control unit 74 of the preconditioning device 14 is connected to the production control unit 70 and with display unit 76.

The assembly sequence is as follows. Input is made via the coding device 72 in the production control 70 unit as to which internal combustion engine is due for assembly and which V-belt 54 is to be used. This V-belt 54 is displayed (i.e. its corresponding order number is displayed) in unit 76, and may be installed on a preconditioning device 14 by an authorized person. Following a start signal initiated by the installing person, the preconditioning device is started, and the corresponding parameters such as pretension, preconditioning time, etc., are provided or regulated by the production control unit 70. After the preconditioning procedure, the operator who is installing the belt 54 can remove it from the preconditioning device 14 and immediately (i.e. within approximately 10 mins.) install it on the internal combustion engine 62 which has arrived at the assembly point. Placing and removing of the V-belt 54 on the preconditioning device 14 may also be performed automatically. The belt drive may for instance be designed as described in German patent DE-PS 30 39 215, whereby after tensioning of the belt 54, the tensioning device is fixed or blocked. The tensioning device, however, may be any possible design, since it is not the subject of the present invention and therefore is not described herein. The invention is not limited to the preferred embodiment with a V-belt and a belt drive for an internal combustion engine. Instead of V-belts, belts of any design, e.g. flat belts, serrated belts, etc., may also be driven by a similarly designed preconditioning device before initial installation. For those cases, different parameters than those disclosed here for preconditioning time, pretension, number of revolutions or pulley diameters may be useful. Instead of using hydraulic means, pretension may also be implemented by a corresponding compressed air source or by weight loading.

We claim:

1. A method of providing a belt on a belt drive comprising the steps of driving the belt on a preconditioning device at a predetermined tension level and for a predetermined period of time prior to installing the belt on the belt drive, and installing the belt on the belt drive immediately after removal from the preconditioning device.

2. A method according to claim 1 wherein said belt is a V-belt for driving auxiliary equipment on an internal combustion engine.

3. A method according to claim 1 or 2 wherein said tension level is held constant for said predetermined period of time.

4. A method according to claim 1 or 2 wherein said step of driving is performed for approximately 3–5 minutes.

5. A method according to claim 1 or 2 wherein said belt is driven by a pulley with a diameter greater than 70 mm and said pulley is driven at 1000–2000 revolutions per minute.

6. A method for installing a plurality of belts on a belt drive of an internal combustion engine wherein the belts are tensioned on the belt drive using an adjustable tensioning device, the method comprising the steps of delivering the belts on a production assembly line, driving each of the belts on a preconditioning device at a predefined tension level and for a predefined period of time, delivering each of the belts from the preconditioning device for installation on the belt drive, and immediately installing each of the belts on the belt drive.

7. A method according to claim 6 wherein said belts are V-belts for driving auxiliary equipment on an internal combustion engine.

8. A method according to claim 6 wherein said tension level is held constant for said predefined period of time.

9. A method according to claim 6 wherein said step of driving is performed for approximately 3 to 5 minutes.

10. A method according to claim 6 wherein each of said belts is driven by a pulley with a diameter greater than 70 mm and said pulley is revolved at 1000 to 2000 revolutions per minute.

* * * * *